INVENTOR.
Arthur I. Anderson

Dec. 6, 1966   A. I. ANDERSON   3,289,396
PRESSURE EQUALIZING AND FILTER ARRANGEMENT FOR PRESSURIZED
STORAGE TANKS HAVING VOIDS THEREIN
Filed Jan. 14, 1963   2 Sheets-Sheet 2

INVENTOR.
Arthur I. Anderson
BY
Scofield, Kokjer, Scofield & Lowe
ATTORNEYS.

United States Patent Office 3,289,396
Patented Dec. 6, 1966

3,289,396
PRESSURE EQUALIZING AND FILTER ARRANGEMENT FOR PRESSURIZED STORAGE TANKS HAVING VOIDS THEREIN
Arthur I. Anderson, St. Paul, Minn., assignor to Butler Manufacturing Company, Kansas City, Mo., a corporation of Missouri
Filed Jan. 14, 1963, Ser. No. 251,310
6 Claims. (Cl. 55—385)

This invention relates generally to the handling of pulverulent material in bulk under pressurized conditions in storage containers and refers more particularly to an improved arrangement for obtaining satisfactory equalization of pressures across certain common walls between a storage zone and adjacent voids without transmission of the pulverulent material to and deposit of it in the void.

In the construction of containers for pulverulent material which are to be unloaded through the use of pneumatic means, it is quite common to place slope sheets within the container which subdivide the container and separate the storage zone from empty pockets within the container. These pockets are termed voids. Normally, they are gas-tight, as is the storage zone itself. When gas pressure is built up in the storage zone, it is applied, of course, to the partition or dividing wall between the storage zone and void. Thus, the partition must be capable not only of bearing the applied weight of the material itself but also the load imposed due to the pressure differential across the partition.

The most common way of solving the problem of pressure differential loads is to set up communication between the upper end of the storage zone, where material is supposed not to be present, at least not in its quiescent state, and the void. Thus, the pressure is equalized at all times between the storage zone and void. However, it has been found that during times that pressure is being applied in the storage zone, particularly where substantial or rapid variations in pressure occur, the material may be air suspended as "dust" and is carried into the void where it collects as a permanent deposit.

Among the objects of the present invention are to provide a pressure equalization and filter arrangement in which migration of the so-called "dust" from the storage zone into the voids is prevented yet in which the filter itself is so located and positioned as to produce a large filter area in relation to the cross-sectional area of the communicating passageways between the storage zone and void; which provides a setting for the filter in which the filter tends to be self-cleaning; in which the filter structure is easily removable for more complete cleaning yet is firmly held in operative position during use; which is economical and simple to incorporate in a wide variety of pneumatic units, both stationary and mobile; and which in no way interferes with nor is subject to unwanted dust deposits during the loading of the storage zone.

Other and further objects of the invention together with the features of novelty appurtenant thereto will appear in the course of the following description.

In the accompanying drawings, which form a part of the specification and are to be read in conjunction therewith and in which like reference numerals indicate like parts in the various views.

Figure 1:
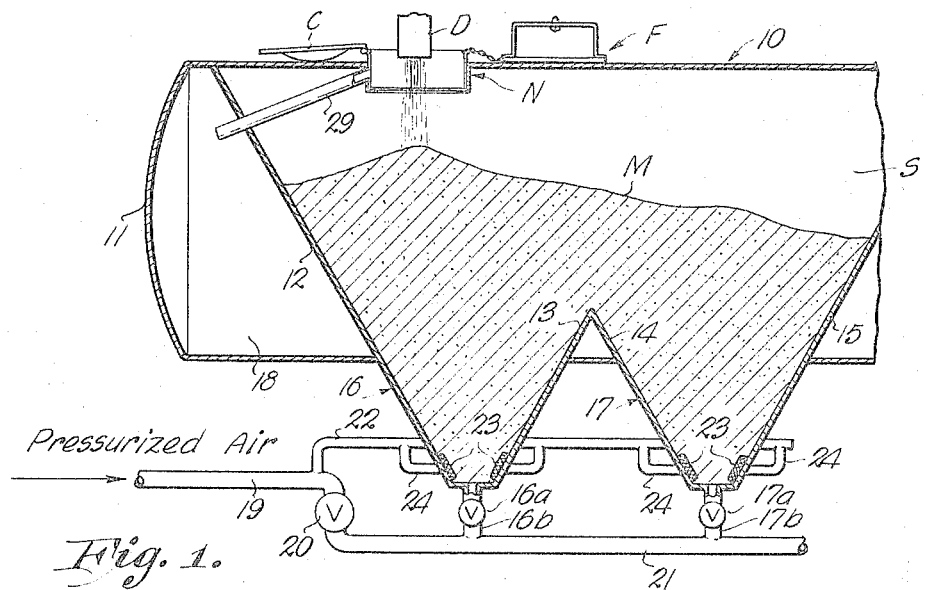
FIG. 1 is a fragmentary longitudinal sectional view, partly schematic, through a storage unit equipped with the invention, the components being shown as they would be positioned during filling of the storage zone.
Figure 2:
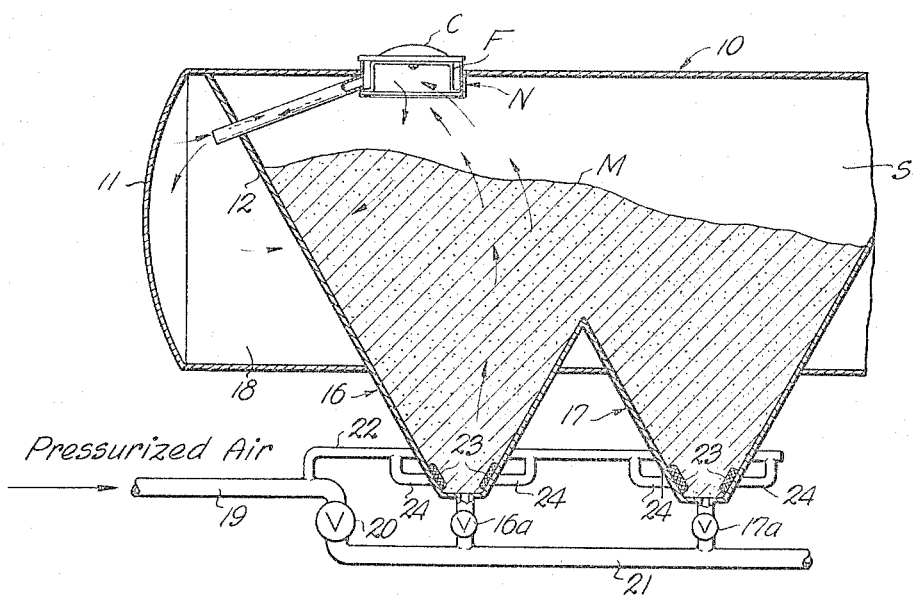
FIG. 2 is a view similar to FIG. 1 but showing the structure with the components in the positions they are placed during times when the storage zone is being maintained under pressure.

Referring now to the drawings and initially to FIGS. 1 and 2, for purposes of illustrating one typical application of the invention there is shown a portion of an elongate horizontal cylindrically walled tank 10 having the forward dome 11. The tank may be of the type that is mounted on wheels to provide a tank transport trailer. The tank is made gas-tight. It is provided with bulkheads or partitions 12, 13, 14 and 15 which cooperate with each other and the tank walls to provide a storage space S and hoppers 16, 17 having outlets controlled by valves 16a, 17a respectively. The partitions extend through and are sealed to appropriate openings in the bottom of tank 10. As will be evident, the bulkhead 12 forms with the forward dome 11 a void or open space or pressure equalization chamber 18.

The pulverulent material M which, for purposes of illustration may be considered as dry cement, is introduced to the storage space S through a filler neck generally identified at N. A delivery spout D is shown in FIG. 1. The filler neck is equipped with a hinged cap C which is of the conventional clamp grip type. Caps of this type are well known and conventional in the art and since any one of many different commonly and commercially available ones may be used, further description is not required.

It will be observed that the unit is provided with a pneumatic unloading system which involves the main air line 19 which is connected through regulator valve 20 with the material discharge line 21. The main air line 19 leads from any convenient source of pressurized air, such as, for example, a blower or compressor (not shown). The material flow control valves 16a, 17a are interposed in lines 16b, 17b, respectively, which connect laterally into the discharge line 21. Valves 16a, 17a are normally closed during filling and until unloading is to be effected.

A branch line 22 connects with and leads from line 19 ahead of the regulator valve. This line serves to supply air to the storage space S. For this purpose, diffusers 23 are mounted on the inside walls of the hoppers. These diffusers are also of a commercially available type and may be like those disclosed in the copending application of Arthur I. Anderson and Karel Konicek, Serial No. 21,162, filed April 11, 1960, now Patent No. 3,152,842. Air is supplied to the diffusers from line 22 through connecting lines 24.

Figure 4:
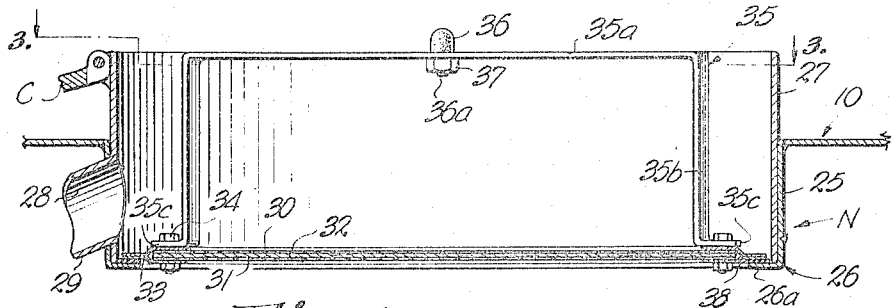
FIG. 4 is a sectional view taken along line 4—4 of FIG. 3 in the direction of the arrows.
Figure 3:
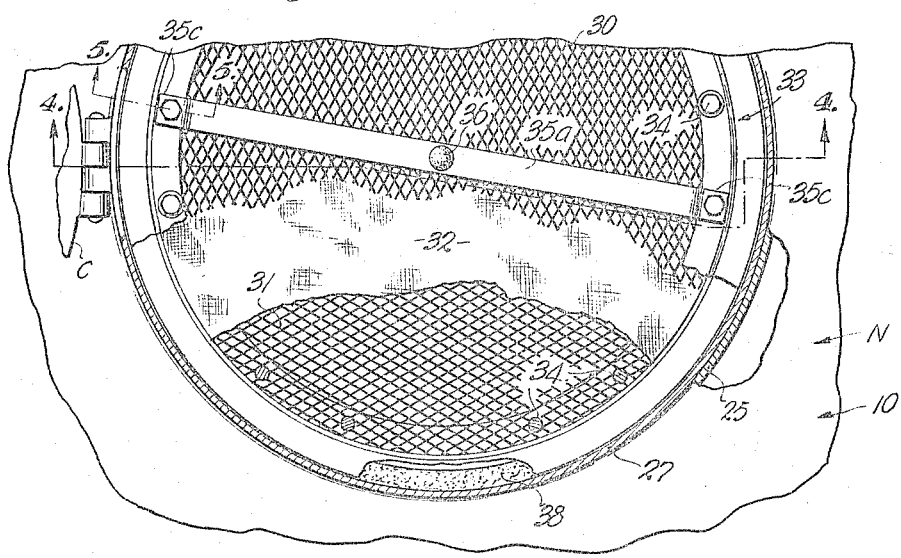
FIG. 3 is a greatly enlarged fragmentary top plan view of the filler neck and installed filter structure, parts being broken away for purposes of illustration.
Figure 5:
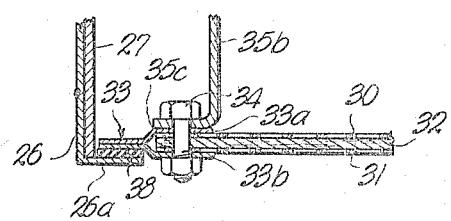
FIG. 5 is an even further enlarged fragmentary sectional view taken along line 5—5 of FIG. 4 in the direction of the arrows.

Referring further now to FIGS. 3, 4 and 5, the filler neck N includes a ring 25 secured, as by welding, to the edge of an opening formed in the top wall of the tank and depending therein. The ring has welded thereto a circularly formed angle section 26 having the inturned horizontal leg 26a which forms an annular shoulder at the lower end of the ring. A cylindrical neck element 27 fits within ring 25 and is secured thereto as by appropriately spaced spot welds (not shown). It will be noted that leg 26a extends well inside of the internal surface of neck element 27.

An opening 28 is formed in neck element 27 and extending into this opening and welded thereto is one end of a conduit 29. It will be noted that the end of the conduit secured to the neck is so formed as to be flush with the inside wall of the neck element. The other end of the conduit extends through the bulkhead 12, an appropriate opening therefor being provided. A seal is formed, preferably by welding, between the conduit and the opening through the bulkhead so as to establish the conduit itself as the only means of communication between the void 18 and the storage space S.

Reference numeral F identifies generally a filter structure which, when the unit is being filled, is adapted to be placed upon the top of the tank out of the way of the filler neck, as shown in FIG. 1, and after filling has been completed, is inserted in the filler neck and held therein when the cap C is closed, as viewed in FIG. 2.

The filter structure includes a pair of foraminous disk-like members 30 and 31 which have sandwiched therebetween a porous filter cloth 32. The disks are constructed of a material such as expanded metal. Around their rims, they are held between the oppositely disposed parallel flanges 33a, 33b of a ring member 33, which conveniently can be constructed by superimposing two ring-like members and joining the abutting portions by spot welds (not shown). This is best appreciated from an examination of FIG. 3.

The disk and filter cloth assembly is secured to the ring member 33 by means of circumferentially spaced bolts 34 which extend through appropriate openings in the flange portions 33a, 33b and the disks 30 and 31. The filter structure is completed by a positioning means comprising a generally diametrically extending U-shaped member 35 having the elongate bight portion 35a spaced well above the filter base, the vertical legs 35b, and the short right angle extensions 35c which are bolted to the main filter structure as shown in FIG. 3. A top bumper 36 formed of rubber or other resilient material is supported on top of the bight portion 35a, the bumper conveniently having a projecting threaded stub portion 36a which extends through an appropriate opening in the bight and is secured to the bight by the nut 37.

The ring 33 seats on the annular shoulder formed by the leg 26a, and a resilient sealing gasket 38 is interposed between the ring and the shoulder to prevent egress of material around and between the shoulder and ring. The height of the vertical legs 35b is such as to dispose the bumper 36 so that when the cap C is closed, it will be placed under slight compression and thus will serve to hold the ring 33 in sealing contact with the gasket 38.

In the operation of the invention, after the storage zone S has been filled to the desired level with the material M, the delivery spout is removed and the filter structure is inserted in the filler neck N. This is conveniently done by simply grasping the bight 35a of the U-shaped projection and, utilizing it as a handle, lifting the filter structure and dropping it into the filler neck until it seats on the gasket 38. Thereupon, the cap C is closed and locked in place. As earlier noted, engagement of the cap with the bumper 36 serves to firmly seat the rim of the filter structure on the gasket.

Whenever it is desired to unload the material M from the structure, this is commenced by feeding pressurized air to line 19 from whence it is communicated to the interior of the storage zone through line 22 and diffusers 23. Since until the pressurized air is introduced into the tank, the tank remains under atmospheric pressure, obviously there will be a percolation of pressurized air upwardly through the material and a tendency for air to flow through the filter structure, the communicating conduit 29 and into void 18. A certain amount of cement or material will be initially entrained in this air. However, it will be intercepted by the filter structure and prevented from moving into the conduit 29.

When unloading is started, this is done by first cracking the pressure regulator valve 20 to set up a flow through the discharge line 21. Then one of the materials valves 16a or 16b is opened, thereby permitting material to feed into the discharge line. The regulator valve is adjusted so that there is a positive pressure differential between the storage zone S and the interior of line 21; thus the material is always under pressure such as to move into the discharge line. There are inherently variations in pressure because of nonuniform flow in the discharge line, which variations always have a tendency to cause interexchange of air between the void 18 and the storage zone S. However, the filter guards against any interchange of solids between these zones.

Because of the way in which the filter is supported, it obviously has a substantially greater cross-sectional area than the cross-sectional area of the conduit 29. This assists in more rapid and better transmission of pressure differentials between the storage zone and the void and eliminates the possibility of momentary pressure differential loads on the bulkhead 12. Also the disposition of the filter structure is such that any material which might temporarily collect on the underside of the filter is unlikely to be retained thereon, since both back air flow from the void on depressurization and gravity will cause it to fall back into the tank, therefore avoiding the problem of clogging.

When the tank is empty and when it is desired to refill it, the cap C is simply lifted and the filter structure withdrawn in order to provide an opening through which material can again be introduced.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. The combination with a vessel including a pneumatically pressurized storage compartment and a pressure equalization chamber having a common wall with the storage compartment, of a filler neck fitted into an opening in said vessel and communicating with said compartment, a removable cap for the outer end of said neck, a conduit proceeding laterally from a side opening in said filler neck and establishing communication between the space enclosed by said neck and said pressure equalization chamber, a filter structure removably inserted through the outer end of said filler neck and to a location inwardly of said side opening, seat means within said neck for supporting said filter structure at said location while still permitting withdrawal of said filter structure from the filler neck through the outer end thereof, and positioning means extending from said cap when said cap is closed to said filter structure and operable to hold said filter structure seated when said cap is closed.

2. The combination as in claim 1 wherein said seat means comprises an inwardly projecting annular shoulder in said filler neck located inwardly of said side opening, the said filter structure having a marginal portion seating on said shoulder.

3. The combination as in claim 1 wherein said filter structure comprises a porous fabric sandwiched between stiff foraminous cover members.

4. The combination as in claim 1 wherein said positioning means comprises an inverted, U-shaped member having a bight with a resilient element thereon engageable by the inside of said cap and spaced legs secured at their ends to said filter structure near diametrically opposite points thereon.

5. The combination as in claim 2 including a yieldable sealing gasket interposed between said shoulder and said marginal portion of the filter structure.

6. The combination as in claim 3 including a ring member around the edge of said cover members and having parallel flanges on opposite sides thereof which engage and clamp said cover members together with the fabric therebetween.

References Cited by the Examiner
UNITED STATES PATENTS

| | | | |
|---|---|---|---|
| 1,459,610 | 6/1923 | Bosshart et al. | 55—505 XR |
| 2,524,919 | 10/1950 | Meincke | 302—42 |
| 2,792,262 | 5/1957 | Hathorn | 302—53 |

HARRY B. THORNTON, *Primary Examiner.*

L. H. McCARTER, D. TALBERT, *Assistant Examiners.*